(12) United States Patent
Schneider (10) Patent No.: US 8,527,500 B2
(45) Date of Patent: Sep. 3, 2013

(54) PREPROCESSING TEXT TO ENHANCE STATISTICAL FEATURES

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 391 days.

(21) Appl. No.: 12/395,319

(22) Filed: Feb. 27, 2009

(65) Prior Publication Data

US 2010/0223288 A1 Sep. 2, 2010

(51) Int. Cl.
*G06F 17/30* (2006.01)

(52) U.S. Cl.
USPC ........... 707/713; 707/706; 707/714; 707/715; 707/716; 707/717; 707/718; 707/719; 707/722; 707/758; 707/781

(58) Field of Classification Search
USPC ................. 707/706, 713–719, 722, 758, 781, 707/999.001, 999.002, 999.003
See application file for complete search history.

(56) References Cited

U.S. PATENT DOCUMENTS

| | | | |
|---|---|---|---|
| 5,550,741 A * | 8/1996 | Nakajima | 715/271 |
| 5,796,356 A | 8/1998 | Okada et al. | |
| 5,801,648 A | 9/1998 | Satoh et al. | |
| 5,844,508 A | 12/1998 | Murashita et al. | |
| 5,848,198 A | 12/1998 | Penn | |
| 5,907,637 A | 5/1999 | Murashita et al. | |
| 6,026,198 A | 2/2000 | Okada | |
| 6,061,398 A | 5/2000 | Satoh et al. | |
| 6,738,759 B1 * | 5/2004 | Wheeler et al. | 707/741 |
| 7,124,149 B2 | 10/2006 | Smith et al. | |
| 7,593,932 B2 * | 9/2009 | Lindh et al. | 1/1 |
| 7,831,559 B1 | 11/2010 | Mohan et al. | |
| 2002/0065857 A1 | 5/2002 | Michalewicz et al. | |
| 2002/0094080 A1 | 7/2002 | Duan et al. | |
| 2003/0012400 A1 | 1/2003 | McAuliffe et al. | |
| 2003/0033288 A1 * | 2/2003 | Shanahan et al. | 707/3 |
| 2003/0061200 A1 * | 3/2003 | Hubert et al. | 707/3 |
| 2003/0065503 A1 * | 4/2003 | Agnihotri et al. | 704/7 |
| 2003/0101164 A1 * | 5/2003 | Pic et al. | 707/1 |
| 2003/0154071 A1 | 8/2003 | Shreve | |
| 2003/0200505 A1 * | 10/2003 | Evans | 715/507 |
| 2004/0064438 A1 | 4/2004 | Kostoff | |
| 2004/0217944 A1 * | 11/2004 | Kong | 345/173 |
| 2005/0086224 A1 * | 4/2005 | Franciosa et al. | 707/6 |
| 2005/0102614 A1 | 5/2005 | Brockett et al. | |
| 2005/0108001 A1 * | 5/2005 | Aarskog | 704/10 |

(Continued)

OTHER PUBLICATIONS

Hua-Jun Zeng, Qi-Cai He, Zheng Chen, Wei-Ping Ma, Jinwen Ma, "Learning to Cluster Web Search Results", ACM, Jul. 25-29, 2004, 8 pgs.

(Continued)

*Primary Examiner* — Syling Yen
(74) *Attorney, Agent, or Firm* — Lowenstein Sandler LLP (57) ABSTRACT

A document preprocessor preprocess a document to enhance the statistical features of the document. The system preprocesses the document by matching a prefix and a trailing context in the document with one or more matching prefixes in a transformation database, where the prefix is a first string of one or more tokens in the first document and the trailing context is a second string of one or more tokens in the first document that trail the prefix. Alternatively, the system preprocesses the document by computing cyclic permutations of the document, sorting these permutations and taking the last token from each of the sorted permutations.

18 Claims, 6 Drawing Sheets

(56) References Cited

U.S. PATENT DOCUMENTS

| | | | |
|---|---|---|---|
| 2006/0015486 A1* | 1/2006 | Nomiyama et al. | 707/3 |
| 2006/0089924 A1 | 4/2006 | Raskutti et al. | |
| 2006/0235687 A1* | 10/2006 | Carus et al. | 704/252 |
| 2007/0061320 A1 | 3/2007 | Surendran | |
| 2007/0061348 A1 | 3/2007 | Holland et al. | |
| 2007/0206884 A1* | 9/2007 | Kato | 382/305 |
| 2007/0233477 A1 | 10/2007 | Halowani et al. | |
| 2008/0005651 A1* | 1/2008 | Grefenstette et al. | 715/500 |
| 2008/0052273 A1 | 2/2008 | Pickens | |
| 2008/0082531 A1 | 4/2008 | Suarez | |
| 2008/0114750 A1 | 5/2008 | Saxena et al. | |
| 2008/0162455 A1 | 7/2008 | Daga et al. | |
| 2008/0162456 A1* | 7/2008 | Daga et al. | 707/5 |
| 2008/0270119 A1 | 10/2008 | Suzuki | |
| 2009/0030671 A1* | 1/2009 | Kwon et al. | 704/2 |
| 2009/0055380 A1 | 2/2009 | Peng et al. | |
| 2009/0125805 A1* | 5/2009 | Ananthanarayanan et al. | 715/255 |
| 2010/0005087 A1 | 1/2010 | Basco et al. | |
| 2010/0027051 A1 | 2/2010 | Hamilton et al. | |
| 2010/0131569 A1* | 5/2010 | Jamison et al. | 707/803 |
| 2011/0320453 A1 | 12/2011 | Gallivan et al. | |

OTHER PUBLICATIONS

Red Hat Office Action for U.S. Appl. No. 12/395,341 mailed Jul. 6, 2011.

Red Hat Office Action for U.S. Appl. No. 12/395,507 mailed Jul. 15, 2011.

USPTO, Final Office Action for U.S. Appl. No. 12/395,341 mailed Dec. 7, 2011.

USPTO, Final Office Action for U.S. Appl. No. 12/395,507 mailed Dec. 1, 2011.

USPTO, Advisory Action for U.S. Appl. No. 12/395,507 mailed Feb. 2, 2012.

USPTO, Advisory Action for U.S. Appl. No. 12/395,341 mailed Feb. 6, 2012.

USPTO, Office Action for U.S. Appl. No. 12/395,341 mailed May 23, 2012.

USPTO, Office Action for U.S. Appl. No. 12/395,507 mailed Jun. 12, 2012.

USPTO, Notice of Allowance for U.S. Appl. No. 12/395,341 mailed Oct. 23, 2012.

USPTO, Notice of Allowance for U.S. Appl. No. 12/395,507 mailed Nov. 6, 2012.

* cited by examiner

PREPROCESSING TEXT TO ENHANCE STATISTICAL FEATURES

RELATED APPLICATIONS

This application is related to co-pending U.S. patent application Ser. No. 12/395,341 filed Feb. 27, 2009, entitled "MEASURING CONTEXT SIMILARITY" and co-pending U.S. patent application Ser. No. 12/395,507, filed Feb. 27 2009, entitled "DISCRIMINATING SEARCH RESULTS BY PHRASE ANALYSIS," which are assigned to a common assignee of the present application.

TECHNICAL FIELD

Embodiments of the present invention relate to a method and system for processing documents. Specifically, embodiments of the invention relate to preprocessing text in a document to enhance the statistical features of the document.

BACKGROUND

Contextual similarity is way of measuring the similarity of two documents. Contextual similarity measures whether two documents have the same words in the same place (e.g., context). This is different from a semantic similarity measurement system, which measures the similarity in the meaning between two documents.

Because contextual similarity measures whether the same words are in the same place in documents, contextual similarity measurement system can treat two documents as being dissimilar even though these documents are semantically similar. These systems tend to rely on the precise ordering and spelling of the words in the documents to provide these results. For example, the two semantically identical sentences "The ball is green" and "It's a green ball" only share two words and the order of the two words is different between the two. Thus, the contextual similarity of these two sentences is quite low. It would be useful to preprocess documents for a contextual similarity measurement system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The document preprocessor preprocesses a document to enhance statistical features of the document. In one embodiment, the document preprocessor preprocesses the document by contextually preprocessing that document. In this embodiment, the document preprocessor provides words and/or phrases substitutions for the contents of the document based on the context of the words and/or phrases being replaced.

In another embodiment, document preprocessor preprocesses the document by rearranging the order of the words and/or phrases in the document. In this embodiment, the document preprocessor applies a Burroughs-Wheeler transform to the document using the words of the document as the basic operating unit for the transform.

Figure 1:
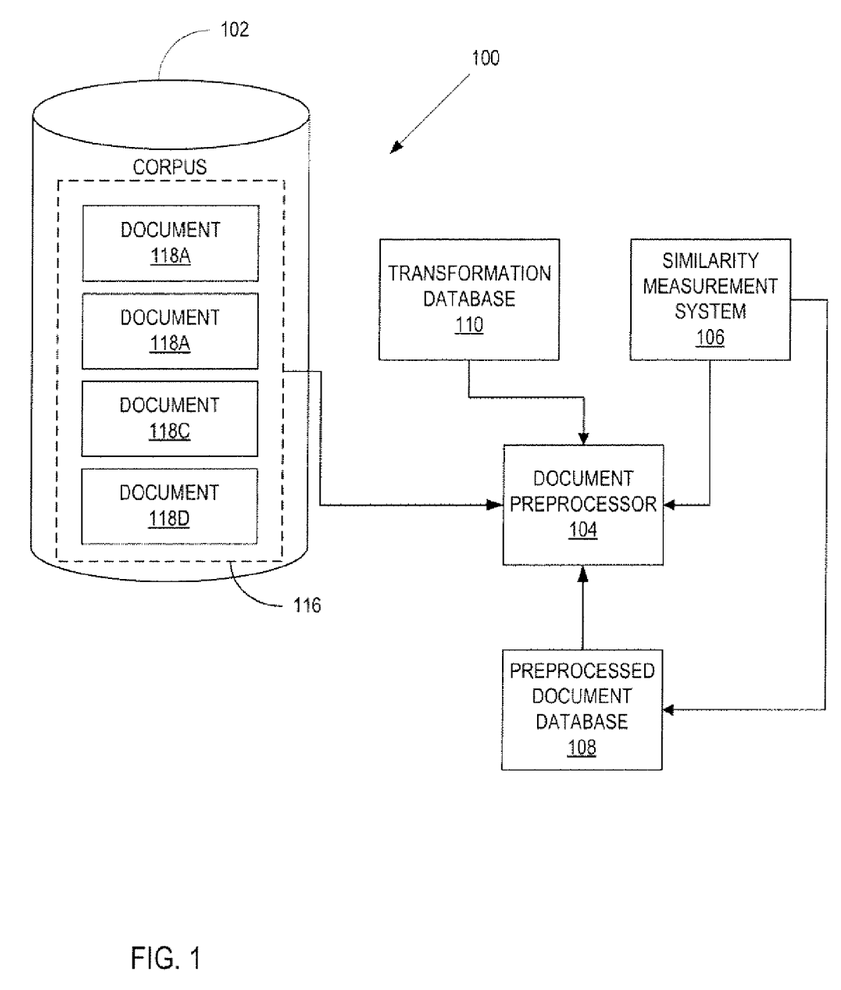
FIG. 1 is a block diagram of one embodiment of a document processing system that includes a document preprocessor.

FIG. 1 is a block diagram of one embodiment of document processing system 100 that includes a document preprocessor 104. In FIG. 1, document processing system 100 comprises document database 102, document preprocessor 104, similarity measurement system 106, preprocessed document database 108, and transformation database 110. Document database 102 comprises a corpus of documents 116. Corpus 116 is the set of documents available to document processing system 100 and comprises documents 118A-D. While in one embodiment, corpus 116 is stored in one database, in alternate embodiments, corpus 116 is stored across multiple databases on one or more different machines.

Document preprocessor 104 preprocesses documents 118A-D to enhance the statistical features for each of those documents. In one embodiment, the statistical features being enhanced are the statistical features that are measured in contextual similarity models. For example, the statistical features of a document are the selection, ordering, and frequency of words. In one embodiment, document preprocessor 104 enhances the statistics of various documents such that documents with high semantic similarity wind up with higher contextual similarity, while documents with low semantic similarity wind up with lower contextual similarity. In this embodiment, document preprocessor 104 maps contextual similarity onto semantic similarity by selectively changing the input documents and the statistical features for the input documents.

In one embodiment, document preprocessor 104 preprocesses documents 118A-D by contextually preprocessing these document. In this embodiment, document preprocessor 104 provides word and/or phrase substitutions for the contents of documents 118A-D) based on the context of these words and/or phrases in the document. For example and in one embodiment, document preprocessor 104 replaces the words "propel" with "row" and "water craft" with "boat." In this example, the phrase "propel, propel, propel, your water craft" is transformed into "row, row, row, your boat." In one embodiment, document preprocessor 104 uses the transformations stored in transformation database 110 to perform the contextual substitutions. Contextual preprocessing is described further below with reference to FIG. 3.

In an alternate embodiment, document preprocessor 104 preprocesses document 118A-D by rearranging the order of the words and/or phrases in documents 118A-D. In one embodiment, document preprocessor 104 performs a Burroughs-Wheeler transform on the words and/or phrases a document. While in one embodiment, document preprocessor 104 performs the Burroughs-Wheeler transform on an unpreprocessed document, in an alternate embodiment, document preprocessor 104 performs this Burroughs-Wheeler transform on a document that has been contextually preprocessed. Order rearrangement preprocessing is further described with reference to FIG. 4 below.

Similarity measurement system 106 is a system that measures the similarity between two or more documents, where one or more of the documents to be measure have been preprocessed using document preprocessor 104. While in one embodiment, similarity measurement system 106 is a contextual similarity measurement system, in an alternate embodiment, similarity measurement system 106 is a semantic similarity measurement system. Similarity measurement system 106 can either retrieve the preprocessed documents via document preprocessor 104 or from preprocessed document database 108.

Figure 2:
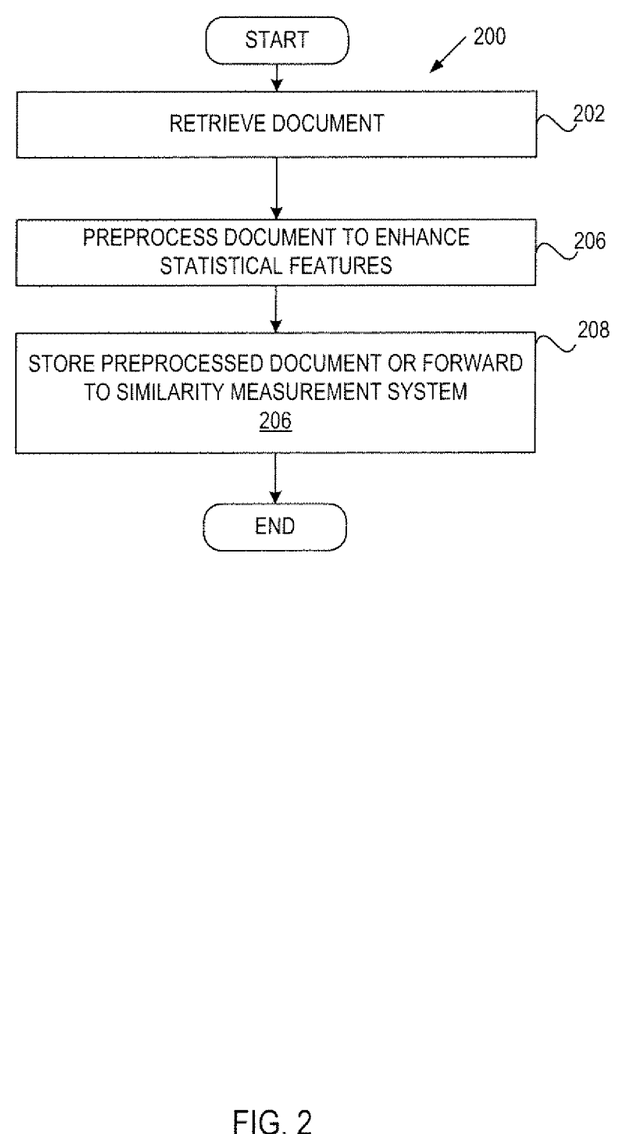
FIG. 2 is a flowchart diagram of one embodiment of a process for preprocessing a document to enhance the statical features of the document.

FIG. 2 is a flowchart diagram of one embodiment of a process 200 for preprocessing a document to enhance the statistical features of the document. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 200 is performed by a document preprocessor used in a contextual similarity measurement systems such as document preprocessor 104 of FIG. 1.

Referring to FIG. 2, process 200 begins with processing logic retrieving a document at block 202. In one embodiment, process 200 retrieves one of documents 118A-D from document database 102 as described above with reference to FIG. 1.

At block 204, process 200 preprocesses the retrieved document. In one embodiment, process 200 preprocesses the retrieved with contextual preprocessing by providing word and/or phrase substitutions for the contents of the retrieved document. Contextual preprocessing is discussed further below with reference to FIG. 3.

In an alternate embodiment, process 200 preprocesses document 118A-D by rearranging the order of the words and/or phrases in documents using a Burroughs-Wheeler transform on the words and/or phrases in the document. Order rearrangement preprocessing is further described with reference to FIG. 4 below.

In a further embodiment, process 200 performs a contextual preprocessing of the document following by an order rearrangement preprocessing of the preprocessed document. Alternatively, process 200 can perform this preprocessing in reverse, an order rearrangement preprocessing of the document following by a contextual preprocessing of the preprocessed document.

Process 200 stores the preprocessed document in a preprocessed document database or forwards the preprocessed document to the similarity measurement system at block 206.

Figure 3:
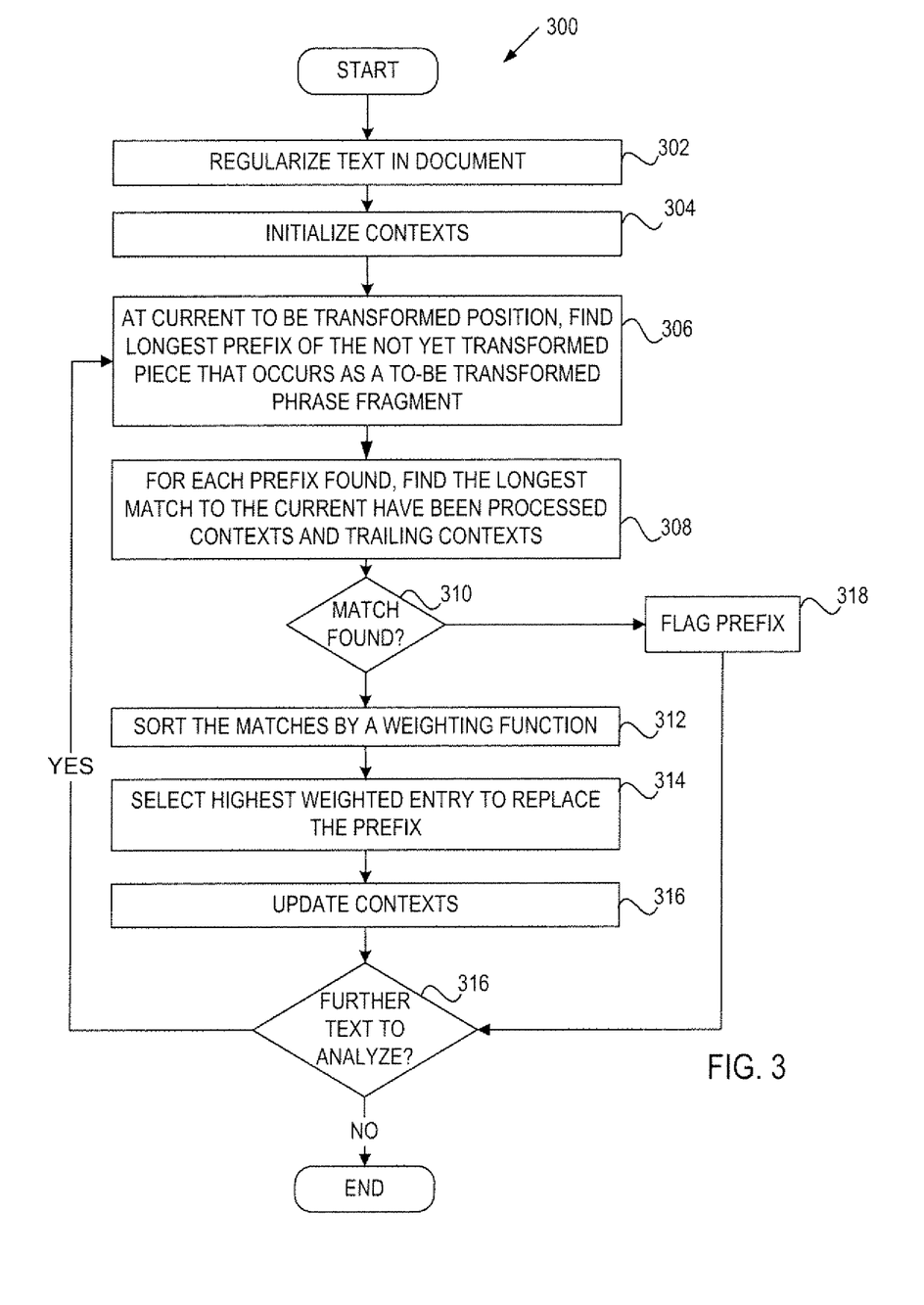
FIG. 3 is a flowchart of one embodiment of a process for contextually preprocessing the document.

FIG. 3 is a flowchart of one embodiment of a process 300 for contextually preprocessing the document. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a similarity model generator used in a contextual similarity measurement system, such as similarity model generator 104 of FIG. 1.

Referring to FIG. 3, process 300 begins with processing logic regularizing the text in the document at block 302. In one embodiment, process 300 regularizes the text by removing punctuation and converting the tokens in the document to lower case. In one embodiment, punctuation is generally removed without adding additional spaces. However, some punctuation, such as the dash "-" character can separate tokens. In this embodiment, the dash character is converted into a space character.

For example, and in one embodiment, paragraph (1):
The Brown Bear (Ursus arctos) is a large bear distributed across much of northern Eurasia and North America. It weighs between 100-700 kg (220-1,500 pounds) and its larger populations such as the Kodiak bear match the Polar bear as the largest extant land carnivores.

is transformed into paragraph (2):
the brown bear ursus arctos is a large bear distributed across much of northern eurasia and north america it weighs between 100 700 kg 220 1500 pounds and its larger populations such as the kodiak bear match the polar bear as the largest extant land carnivores by process 300.

In one embodiment, a token is a sequence of characters considered a single unit. While in one embodiment, a token is a word, in alternate embodiment, a token is an operator symbol(s), abbreviation, number, phrase, syllable, etc., and/or combinations thereof.

At block 304, process 300 initializes the context. In one embodiment, process 300 uses four different contexts: (1) original document processed so far (preceding context), (2) transformed document so far (transformed context), (3) currently being transformed token or phrase (prefix), and (4) the rest of the document (trailing context). In a further embodiment, process uses a fifth context that is the rest of the document that has been translated (trailing translated context). Process 300 can use this additional fifth embodiment when multiple preprocessing passes are being used on the document.

In one embodiment, each context is a string of one or more tokens. For example, and in one embodiment, assume that process 300 is analyzing paragraph (2) at the position of the character "i" in "is." In this example, process 300 has transformed "the brown bear ursus arctos" into "bear." The preceding context contains "the brown bear ursus arctos." The transformed context is "bear," and the prefix is "is a." The trailing context is "large bear distributed . . . carnivores." Furthermore, the current to be transformed position is at the position of the character "i" in "is."

At block 306, process 300 finds, at the current to be transformed position, the longest prefix of the not yet transformed piece that occurs as a to-be transformed phrase fragment. For example, and in one embodiment, if the current position of the transformed piece of paragraph (2) is "brown bear ursus arctos . . . ", the prefixes of "brown", "brown bear", "brown bear ursus arctos" are found. The longest prefix is "brown bear ursus arctos."

Process 300 finds the longest match to the preceding and/or trailing contexts for each prefix found at block 308. In one embodiment, process 300 looks up the found prefixes and/or possible preceding and/or trailing contexts in the transformation database to determine if a match for these one or more contexts are found. In one embodiment, process 300 finds the longest match from all contexts. In this embodiment, in case of a tie, process 300 finds the longest current prefix string within the longest match from all contexts. If there is still a tie, process selects the transformation with the longest matching translated context (followed by preceding context and trailing translated context). For example, and in one embodiment, process 300 finds prefixes "brown", "brown bear", "brown bear ursus arctos." In this embodiment, the matches found for these prefixes are "color" ("brown"), "bear" ("bear"), and "bear" ("brown bear ursus arctos"). In this embodiment, the longest match found is for the prefix "brown bear ursus arctos" ("bear"). Thus, in this example, the phrase "brown bear ursus arctos" is transformed to "bear"

In another embodiment, process 300 uses the preceding and/or the trailing contexts to determine a match for the longest prefix. Process 300 uses these context to aid in finding the appropriate transformation for current prefix.

For example, and in one embodiment, process 300 analyzes the phrase "distributed set of cooperative processes to provide Enterprise functionality." In this embodiment, process 300 selects as the prefix "distributed set of" with the trailing context is "cooperative processes to provide Enterprise functionality." By using the trailing context, process 300 identifies "distributed set of" is being used in a computer science context and not a mathematical context. Thus, process 300 selects the appropriate transformation using the trailing context.

In an alternate embodiment, process 300 restricts the matching of the various contexts to one token per context. In this embodiment, the start of the trailing is defined as the subsequent token after the token in the current prefix.

At block 310, process 300 determines if one or more matches are found for the current prefix, the preceding context, and trailing contexts in the transformation database. If no matches are found, process 300 flags this prefix as not being found in the transformation database at block 318. In one embodiment, process 300 uses this flagged prefix as further training for the transformation database, as is described further below.

If one or more matches are found, process 300 sort these matches by a weighting function at block 312. In one embodiment, the weighting function is illustrated in Equation (1):

$$\text{match value} = a*\text{preceding context match} + b*\text{current prefix} + c*\text{trailing context match}$$

(Equation (1).) In one embodiment, process 300 equally weights matches of the prefix, preceding context matches, and trailing context matches (e.g., a, b, and c have equal values). Alternatively, process can weight higher a prefix match over preceding and/or trailing context matches (e.g., (b>a or c) or (b<a or c)). In a still further embodiment, process 300 weights higher preceding context matches than the trailing context matches and visa versa (e.g., a!=c). Using these weights, process 300 sorts the matches.

At block 314, process 300 selects the highest weighted entry to replace the prefix. In one embodiment, process 300 selects the highest weighted entry and transforms this entry using the transformation database. In this embodiment, process 300 transforms the current prefix of the entry and not the preceding and/or the trailing contexts. In this embodiment, the preceding and/or the trailing contexts are used to identify the entry.

At block 316, process 300 updates the four (or in the alternative, five) contexts. In one embodiment, the transformed prefix is appended to the transformed so far context. In addition, process 300 updates the current position for block 306 to be after the prefix that was transformed.

Process 300 determines if there is further text to analyze at block 318. If there is, process 300 goes to block 306 to analyze the current to be transformed position.

Alternatively, process 300 can make multiple passes using the contextual process. In this embodiment, process 300 transformed the original input document into a transformed document in an initial pass and transforms this transformed documents one or more times using the contextual preprocessing of process 300.

The textual analysis performed by process 300 relies on a transformation database to perform the actual transformations of the different prefixes. In one embodiment, the transformation database is built using training documents and phrases. In this embodiment, the transformation database starts with an empty database, and each time process 300 above gets a flagged prefix, process 300 inquires for input from a trainer. In one embodiment, a trainer is a person that provides the appropriate transformations for the flagged prefix (includes the relevant have been processed and trailing contexts). In an alternate embodiment, a trainer is a computerized translation system. The results from the trainer are added to the transformation database. As the transformation database grows, the number of flagged prefixes determined by process 300 drops. Once the transformation database has reached a threshold size (or, the frequency of requests for information falls below a threshold frequency), tis transformation database can be used.

In one embodiment, better results are achieved by using multiple trainers on the same set of training documents, and combining the transformation databases that get produced. In one embodiment, the lexicon is restricted for the training sessions—if a trainer receives a word for a transformation that's not in the lexicon, the word is rephrased, or the word is added to the lexicon.

In one embodiment, the resulting transformation database includes fields for the preceding context, current prefix, trailing context, and transformation. The transformation fields is used to transform a prefix that has the matching prefix value as well as the preceding and trailing contexts. Example transformation databases are illustrated in Tables 1 and 2 below. In one embodiment, process 300 uses the transformation database as illustrated in Table 1 for a single pass contextual preprocessing. In an alternative embodiment, process 300 uses the transformation database as illustrated in Table 2 for a multiple pass contextual preprocessing.

TABLE 1

Example of the transformation database.

| Preceding Context | Prefix | Trailing Context | Transformation |
|---|---|---|---|
| | brown | | color |
| | brown | | bear |
| | bear | | bear |
| | brown bear *ursus* arctos | | bear |
| | *ursus* | arctos | "" |
| | set of distributed | processes | processes |
| | set of distributed | functions | functions |
| | the | | "" |
| band | the the | | music band |

TABLE 2

Example of a one token transformation database that uses a trailing translation context.

| Preceding Context | Translation Context | Prefix | Trailing Context | Trailing Translation Context | Transform |
|---|---|---|---|---|---|
| | | brown | | | color |
| | | bear | | | bear |
| | brown | bear | | | bear |
| ursus | bear | *ursus* arctos | arctos | | "" |
| | | a | | | "" |
| | | is | | | be |
| | | large | | | big |
| | | distributed | across much | | found |
| across | found | across much of northern eurasia and | | | "" "" "" north eurasia "" |

TABLE 2-continued

Example of a one token transformation database that uses a trailing translation context.

| Preceding Context | Translation Context | Prefix | Trailing Context | Trailing Translation Context | Transform |
|---|---|---|---|---|---|
| | | north america | | | north america |
| | | it | | | subject |
| | | weighs | | | weigh |
| | | between | | | "" |
| | | 100 | | | number |
| | | 700 | | | number |
| | number | kg | | | weight |
| | | 220 | | | number |
| | | 1500 | | | number |
| | | pounds | | | weight |
| | | 100 | number weight number number weight | | "" |
| | | 700 | weight number number weight | | "" |
| | | kg | number number weight | | "" |
| | | its | | | subject |
| | | larger | | | big |
| | | populations | | | group |
| | | such | as | | "" |
| | | as | | | example |
| | | kodiak | | | kodiak |
| | | match | | | equal |
| | | polar | bear | | polar |
| | | largest | | | big |
| | | extant | | | live |
| | | land | hunter | | "" |
| | | carnivores | | | hunter |

As an example of process 300, and in one embodiment, process 300 at block 306 takes a prefix of the unprocessed input that occurs as a phrase to be transformed in the transformation model. In this embodiment, process 300 uses the transformation model as illustrated in Table 1. Process 300 looks up the longest segments of each of the contexts in the transformation database, and selects the substitution based on longest match.

In one embodiment, if process 300 is using a model of the English language and detects a single phrase containing the word "the", this phrase would have a transformation value of "" (the empty string). Process 300 removes the word "the" without changing the essential meaning of the document since the purpose of a definite article is to establish identity. In another embodiment, there can be exceptions for definitive articles. For example and in one embodiment, exceptions exist in the transformation module for unusual uses of the word "the," such as, the folk band "The The" might have an entry that matches with surrounding context to provide a transformation of "music band."

Continuing with the example transformation of paragraph (2), the document processed so far context contains "the", the transformed document so far is empty, and the rest of the document is in the trailing context and the phrase in transformation. Process 300 looks up the longest possible phrase match for the prefix and finds "brown bear ursus arctos." which has a substitution of "bear."Furthermore, "is" is transformed into "be", and "a" is transformed into the empty string. At this point, the document processed so far context is "the brown bear ursus arctos is a", the document as transformed is "bear be", and the trailing context begins with the words "large bear distributed across . . . "

Continuing in this fashion, process 300 ends up with the following pidgin transformation of the paragraph (2) into paragraph (3):

bear be big bear found north eurasia north america subject weigh 220 1500 pound subject big population example kodiak bear equal polar bear big living hunter The resulting paragraph (3) is shorter than paragraph (2) and to some extent simpler.

Using the alternative embodiment, in which the contexts are restricted to a single token, process 300 transforms paragraph (2) into paragraph (4):

bear be big bear found north eurasia north america subject weigh number number weight subject big group example kodiak bear equal polar bear example big live hunter In addition, paragraph (5):

ursus arctos the brown bear has a range that extends over areas of north america and northern eurasia weighing 100 to 700 kilograms it is on a par with the polar bear as the biggest terrestrial carnivore alive today is transformed into paragraph (6):

bear found north america north eurasia weigh number number weight equal polar bear example big live hunter In this embodiment, process 300 transforms numbers such as "100" and "700" to the token "number." In addition weight measurements are transformed (e.g., "kg") into the generic token "weight." Using this model, process 300 translates the phrase "100 700 kg 220 1500 pounds" into "number number weight." In this embodiment, the model allows process 300 to suppress the first weight expression, without needing a gigantic model to cover every possible numeric combination. In another embodiment, process 300 performs multiple passes in the contextual preprocessing.

The transform performed by process 300 is data-driven. Using a different transformation database, process 300 can be used standalone, and without the context similarity measurement system, to translate documents from one natural language to another. For example, and in one embodiment, process 300 can translate paragraph (1) into Spanish, with the resulting paragraph (6):

Ursus arctos, el oso marrón, tienen una gama que extienda sobre áreas de Norteamerica y de Eurasia norteño. Pesando 100 a 700 kilogramos, es a la par con el oso polar como el carnívoro terrestre más grande vivo hoy.

Thus, process 300 can not only be used for preprocessing documents for contextual similarity measurements, process 300 can be used to translate documents into different languages.

Figure 4:
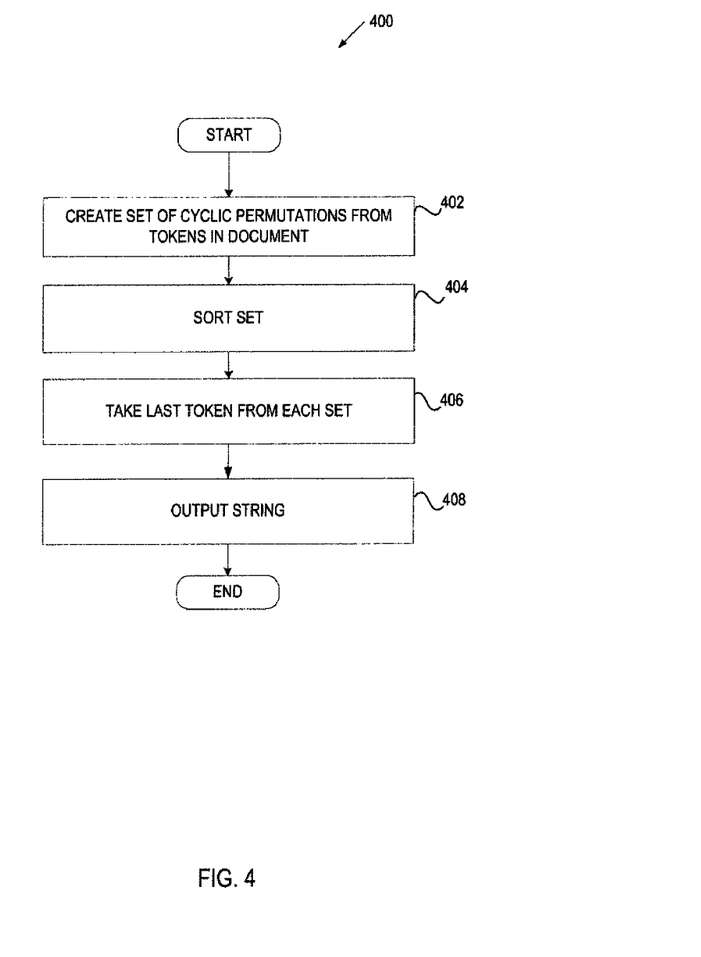
FIG. 4 is a flowchart of one embodiment of a process for preprocessing the document based on order rearrangement.

While process 300 shortens and simplifies the text in a document, process 300 may not change the order of the text except through the phrase translation. FIG. 4 is a flowchart of one embodiment of a process 400 for preprocessing a document based on order rearrangement using a Burroughs-Wheeler transform. As is known in the art, Burroughs-Wheeler transform is used to transform strings, using the characters of the strings as the basic operating unit for the transform. Process 400 applies the Burroughs-Wheeler transform to documents, using the tokens of the documents as the basic operating unit for the transform. The process may be performed by processing logic that may comprise hardware (e.g., circuitry, dedicated logic, programmable logic, microcode, etc.), software (e.g., instructions ran on a processing device to perform hardware simulation), or a combination thereof. In one embodiment, the process 400 is performed by a similarity model generator used in a contextual similarity measurement system, such as similarity model generator 104 of FIG. 1.

Referring to FIG. 4, process 400 begins with processing logic creating a set of cyclic permutations from the tokens in the document. In one embodiment, process 400 creates the set of cyclic permutations by moving the first token in a sequence of tokens to the end of that sequence to create a new permutation for the cyclic set. This is repeated until the original leading token of the input document is at the beginning of the sequence of tokens.

Process 400 sorts this set of cyclic permutations at block 404. In one embodiment, process 400 sorts this set alphabetically.

At block 406, process 400 creates a new sequence of tokens by taking the last token from each set of the cyclic permutations derived at block 404. Process 400 outputs this new set as a string at block 408.

Using this process, process 400 preserves the information of the original document while destroying the order of tokens of that document. Furthermore, process 400 tends to rearrange identical tokens into runs. In addition, process 400 is reversible. For example, and in one embodiment, process 400 transforms paragraph (2) that was preprocessed using the contextual processing into paragraph (7):

220 weigh north hunter polar kodiak big bear be bear subject bear north population living example big eurasia found equal big 1500 pound america subject As another example, process 400 transforms paragraph (3) into paragraph (8):

220 weigh north polar hunter bear pound north bear living big found america equal 1500 eurasia In this example, the paragraph (5) and paragraph are fairly similar.

As a further example, process 400 transforms paragraph (4) into paragraph (9):

north bear hunter kodiak polar big be subject example bear north bear group bear big live example big eurasia found weigh number equal weight america subject number and paragraph (5) into paragraph (10):

north polar hunter example weight north bear bear live big found america weigh equal eurasia number.

Figure 5:
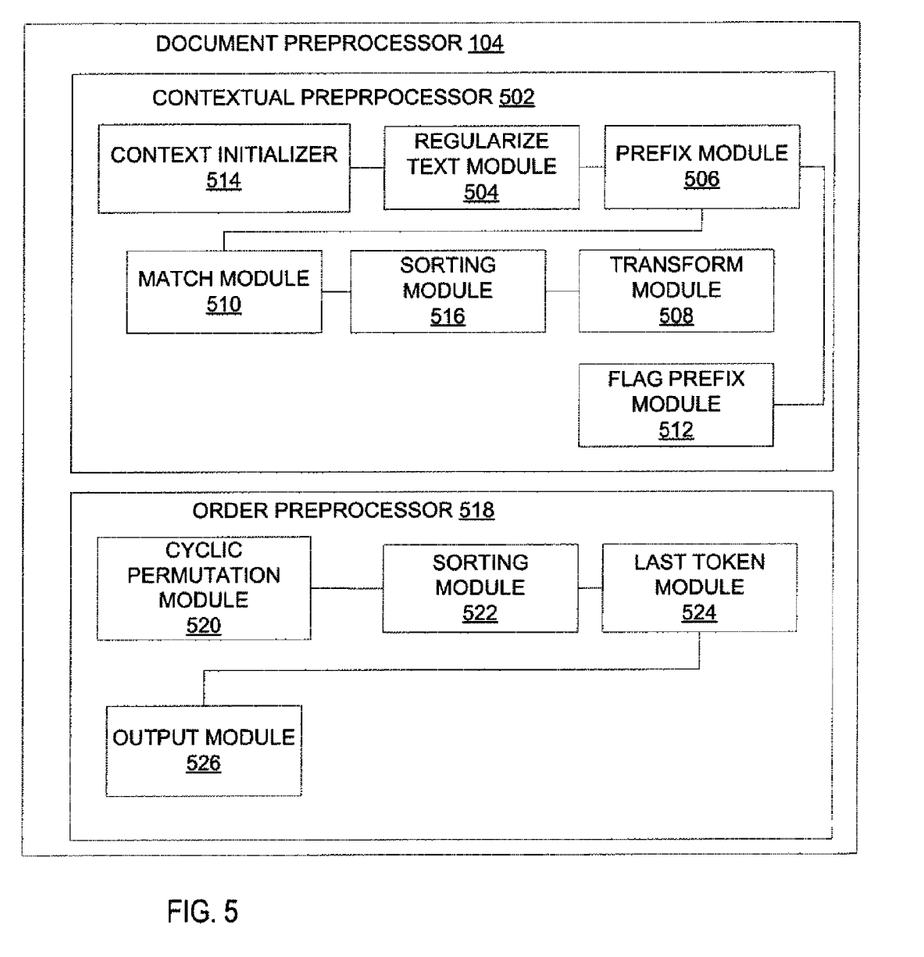
FIG. 5 is a block diagram of a document preprocessor that preprocesses a document to enhance statistical features of that document.

FIG. 5 is a block diagram of a document preprocessor 104 that preprocesses a document to enhance statistical features of that document. In FIG. 5, document preprocessor 104 comprises contextual preprocessor 502 and order rearrangement preprocessor 518. Contextual preprocessor 502 comprises context initializer 514, regularize text module 504, prefix module 506, match module 510, sorting module 516, transform module 508, and flag prefix module 512. Context initializer 514 initializes each of the contexts as described in FIG. 3, block 304. Regularize text module 504 regularizes the text of the document as described in FIG. 3, block 302. Prefix module 506 finds the longest prefix of the not yet transformed piece of the document as described in FIG. 3, block 306. Match module 510 selects the highest weighted entry to replace the found prefix as described in FIG. 3, block 314. Sorting module 516 sorts the found matches for the longest prefix as described in FIG. 3, block 312. Flag prefix module 512 flags prefix as not found in the transformation database as described in FIG. 3, block 318.

Order rearrangement preprocessor 518 comprises cyclic permutation module 520, sorting module 522, last token module 524, and output module 526. Cyclic permutation module 520 creates the set of cyclic permutations as described in FIG. 4, block 402. Sorting module 522 sorts the cyclic permutation as described in FIG. 4, block 404. Last token module 524 takes the last token in each of the cyclic permutations as described in FIG. 4, block 406. Output module 526 outputs the resulting string as described in FIG. 4, block 408.

Figure 6:
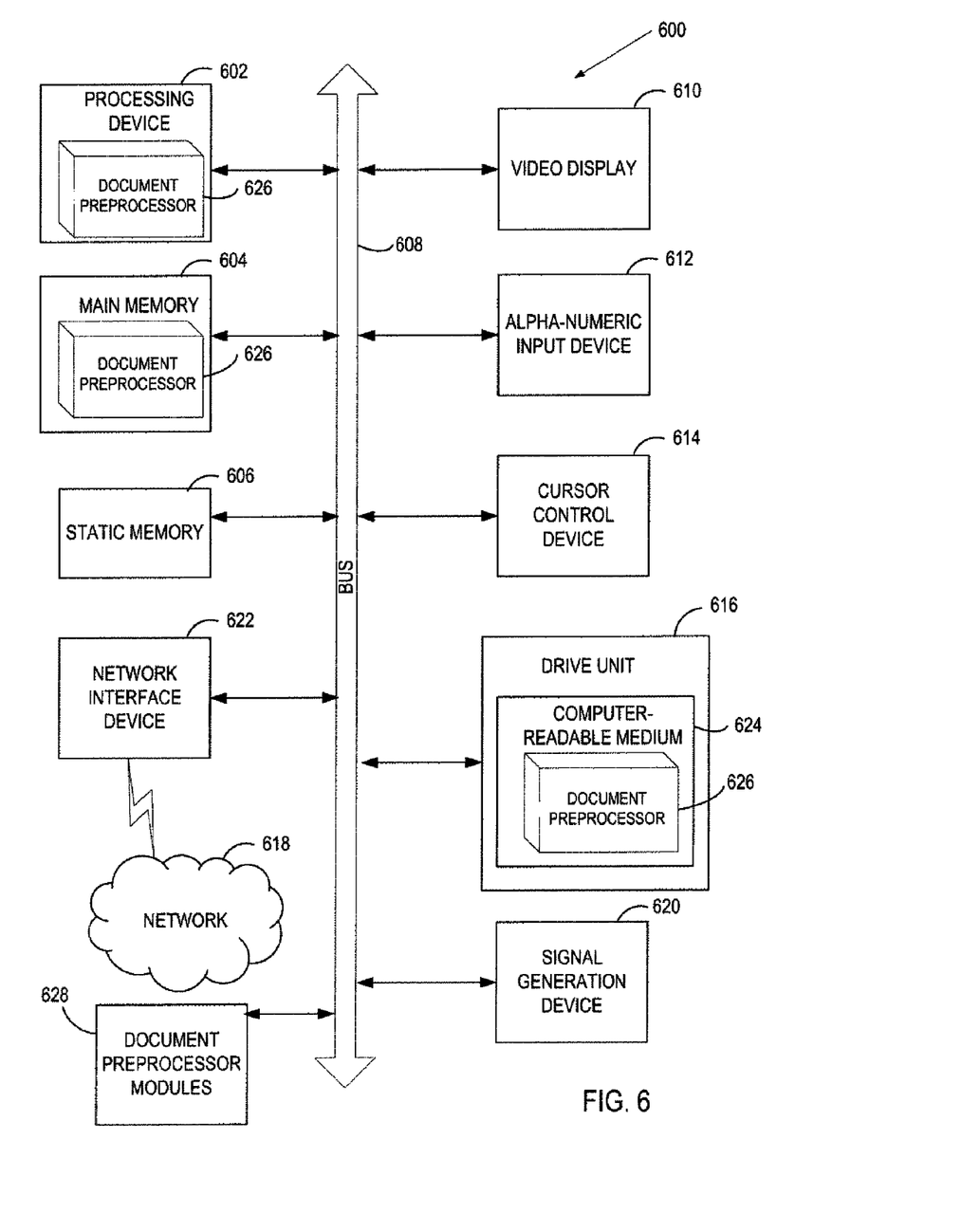
FIG. 6 is a diagram of one embodiment of a computer system for preprocessing a document.

FIG. 6 is a diagram of one embodiment of a computer system 600 for computing a contextual similarity measure. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer accessing documents from a document database and the server computer preprocessing and transmitting documents) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the document preprocessor 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the document preprocessor 626) embodying any one or more of the methodologies or functions described herein. The document preprocessor 626 may also reside, completely or at least partially, within the main memory 604 and/or within the processing device 602 during execution thereof by the computer system 600, the main memory 604 and the processing device 602 also constituting machine-readable storage media. The document preprocessor 626 may further be transmitted or received over a network 618 via the network interface device 622.

The computer-readable storage medium 624 may also be used to store the document preprocessor 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 628, components and other features described herein (for example in relation to FIG. 1) can be implemented as discrete hardware components or integrated in the functionality of hardware components such as ASICS, FPGAs, DSPs or similar devices. In addition, the modules 628 can be implemented as firmware or functional circuitry within hardware devices. Further, the modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "preprocessing,"π"weighting," "sorting," "selecting," "taking," "outputting," "translating," "transforming," "computing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for preprocessing documents been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
retrieving, by a processing device, a first document that is subsequently compared with a second document;
preprocessing, with a document preprocessor executable by the processing device, the first document to enhance statistical features of the first document, wherein the preprocessing comprises:
replacing a prefix in the first document with a semantically similar word of a same language as a language of the prefix, wherein the semantically similar word comprises a different word than the prefix and comprises a meaning of the prefix;
computing a plurality of cyclic permutations from a plurality of tokens in the first document;
sorting the plurality of cyclic permutations;
taking the last token from each permutation of the set of cyclic permutations, and
outputting a string constructed from the plurality of last tokens;
transforming the first document into a first preprocessed document by matching the prefix and a trailing context in the first document with matching prefixes in a transformation database, wherein the prefix comprises a first string of tokens of the plurality of tokens in the first document and the trailing context comprises a second string of tokens of the plurality of tokens that trail the prefix in the first document; and transforming the first preprocessed document into a second preprocessed document by rearranging an order of the plurality of tokens in the first preprocessed document.

2. The computer-implemented method of claim 1, wherein the preprocessing comprises:

matching the prefix and the trailing context in the first document with the matching prefixes in the transformation database.

3. The computer-implemented method of claim 2, wherein the matching further comprises matching a preceding context with a preceding context in the transformation database, wherein the preceding context is a third string of tokens that precede the prefix.

4. The computer-implemented method of claim 2, wherein the matching further comprises:

weighting the one or more matching prefixes, wherein the weighting is based on separate weights for matching the prefix and the trailing context.

5. The computer-implemented method of claim 4, wherein the weights for the matching prefix and the trailing context are different.

6. The computer-implemented method of claim 4, wherein the weighting comprises a separate weight for matching the preceding context.

7. The computer-implement method of claim 2, further comprising:

sorting the matching prefixes according to the weighting; and selecting one of the matching prefixes that has the highest weight.

8. The computer-implemented method of claim 2, wherein the transformation database comprises a data model that allows a translation from one natural human language to another natural human language.

9. A non-transitory computer readable storage medium having instructions stored thereon that, when executed by a processing device, cause the processing device to perform operations comprising:

retrieving, by the processing device, a first document that is subsequently compared with a second document;

preprocessing, with a document preprocessor executable by the processing device, the first document to enhance statistical features of the first document, wherein the preprocessing comprises:

replacing a prefix in the first document with a semantically similar word of a same language as a language of the prefix, wherein the semantically similar word comprises a different word than the prefix and comprises a meaning of the prefix;

computing a plurality of cyclic permutations from a plurality of tokens in the first document;

sorting the plurality of cyclic permutations;

taking the last token from each permutation of the set of cyclic permutations, and outputting a string constructed from the plurality of last tokens;

transforming the first document into a first preprocessed document by matching the prefix and a trailing context in the first document with matching prefixes in a transformation database, wherein the prefix comprises a first string of tokens of the plurality of tokens in the first document and the trailing context comprises a second string of tokens of the plurality of tokens that trail the prefix in the first document; and transforming the first preprocessed document into a second preprocessed document by rearranging an order of the plurality of tokens in the first preprocessed document.

10. The non-transitory computer readable storage medium of claim 9, wherein the matching further comprises matching a preceding context with a preceding context in the transformation database, wherein the preceding context is a third string of tokens that precede the prefix.

11. The non-transitory computer readable storage medium of claim 9, wherein the matching further comprises:

weighting the one or more matching prefixes, wherein the weighting is based on separate weights for matching the prefix and the trailing context.

12. The non-transitory computer readable storage medium of claim 9, wherein the operations further comprises:

sorting the matching prefixes according to the weighting; and selecting one of the matching prefixes that has the highest weight.

13. The non-transitory computer readable storage medium of claim 9, wherein the preprocessing further comprises matching the prefix and the trailing context in the first document with the matching prefixes in the transformation database.

14. The non-transitory computer readable storage medium of claim 11, wherein the weighting comprises a separate weight for matching the preceding context.

15. A document processing system comprising:

a memory;

a processing device communicably coupled to the memory;

a document database communicably coupled to the memory and the processing device, the document database to store a first document that is subsequently compared with a second document; and a document preprocessor executable from the memory by the processing device, the document preprocessor to:

preprocess the first document to enhance statistical features of the first document, wherein document preprocessor further comprises an order preprocessor to, as part of the preprocessing:

compute a plurality of cyclic permutations from a plurality of tokens in the first document;

sort the plurality of cyclic permutations;

take the last token from each permutation of the set of cyclic permutations, and output a string constructed from the plurality of last tokens;

replace a prefix in the first document with a semantically similar word of a same language as a language of the prefix, wherein the semantically similar word comprises a different word than the prefix and comprises a meaning of the prefix;

transform the first document into a first preprocessed document by matching the prefix and a trailing context in the first document with matching prefixes in a transformation database, wherein the prefix comprises a first string of tokens of the plurality of tokens in the first document and the trailing context comprises a second string of tokens of the plurality of tokens that trail the prefix in the first document; and transform the first preprocessed document into a second preprocessed document by rearranging an order of the plurality of tokens in the first preprocessed document.

16. The document processing system of claim 15, wherein the preprocessing further comprises matching the prefix and the trailing context in the first document with the matching prefixes in the transformation database.

17. The document processing system of claim 16, wherein the matching further comprises matching a preceding context with a preceding context in the transformation database, wherein the preceding context is a third string of tokens that precede the prefix.

18. The document processing system of claim 16, wherein the matching further comprises weighting the one or more matching prefixes, wherein the weighting is based on separate weights for matching the prefix and the trailing context.

* * * * *